[11] 3,627,971

[72] Inventors Marc Boncoeur
Paris;
Jean-yves Marhic, Fresnes; Michel Rapin,
Paris, all of France
[21] Appl. No. 869,198
[22] Filed Oct. 24, 1969
[45] Patented Dec. 14, 1971
[73] Assignee Commissariat A L'Energie Atomique
Paris, France
[32] Priorities Oct. 25, 1968
[33] France
[31] 171,533;
June 20, 1969, France, No. 6920832

[54] METHOD CONTINUOUS INSPECTION OF THE QUALITY OF A WELD OBTAINED BY THE ELECTRON BEAM PROCESS
6 Claims, 3 Drawing Figs.
[52] U.S. Cl. .................................................. 219/121 EB, 250/49.5
[51] Int. Cl. .................................................. B23k 9/00
[50] Field of Search .................................................. 219/121, 121 EB; 250/41.9, 49.5 (1), 49.5 (4), 49.5 (7)

[56] References Cited
UNITED STATES PATENTS
| | | | |
|---|---|---|---|
| 2,430,237 | 11/1947 | Moncher .................... | 219/110 |
| 3,054,896 | 8/1962 | Jones et al. .................... | 250/41.9 |
| 3,158,733 | 11/1964 | Sibley .................... | 219/117 |
| 3,196,246 | 7/1965 | El-Kareh .................... | 219/69 |
| 3,426,174 | 2/1969 | Graham et al. .................... | 219/121 |
| 3,461,306 | 8/1969 | Stout et al. .................... | 250/49.5 |
| 3,472,997 | 10/1969 | El-Kareh et al. .................... | 219/121 |

*Primary Examiner*—J. V. Truhe
*Assistant Examiner*—Gale R. Peterson
*Attorney*—Craig, Antonelli & Hill ABSTRACT: A method of continuous quality inspection of a weld formed by electron bombardment of the part to be welded or target by means of an incident electron current $I_b$ which is subdivided into a current $I_p$ which penetrates into the target and a reflected current $I_R$, wherein one of the two electron currents between which the incident current $I_b$ is distributed is recorded graphically as a function of the time which has elapsed since the beginning of the welding operation after being subjected if necessary to derivation as a function of time, and wherein the anomalies observed in the recording curve make it possible to detect weld flaws.

METHOD CONTINUOUS INSPECTION OF THE QUALITY OF A WELD OBTAINED BY THE ELECTRON BEAM PROCESS

This invention relates to a method of continuous inspection of the quality of a weld obtained by the electron beam process.

Variations in depth are liable to occur between the beginning and the end of a welding operation; in addition, the weld may exhibit blisters, blowholes or solid inclusions.

The known methods for checking the state of a weld are based on ultrasonic or gamma-radiographic inspection; these methods have a disadvantage in that they cannot be employed in the case of certain welds, such as those made on spherical surfaces. Moreover, the application of such methods to narrow and deep welds obtained by means of an electron beam produces unreliable results and gives rise to considerable practical difficulty.

This invention relates to a method which is not subject to the disadvantages just mentioned and which makes use of graphic recordings.

The application of the method is based on the following observations:

In the beam welding process, the stream of electrons $I_b$ which issues from the electron gun strikes the part to be welded, which serves as the target, and is subdivided into a stream of electrons $I_p$ which penetrates into the target so as to produce within this latter an electric current and a stream $I_R$ of reflected electrons constituted by high-energy backscattered electrons $I_r$, by secondary electrons $I_s$ having an energy which is less than 50 ev. and by thermal electrons $I_t$ of low energy.

We thus have the following relation between these currents:

$$I_b = I_p + I_R = I_p + I_r + I_s + I_t$$

The present invention relates to a method of continuous quality control of a weld by electron bombardment of the target or part to be welded by means of an incident electron current $I_b$ which is subdivided into a current $I_p$ which penetrates into the target and a reflected current $I_R$. In this method, one of the two electron currents between which the incident current $I_b$ is distributed is recorded graphically as a function of the time which has elapsed from the beginning of the welding operation after having been subjected if necessary to derivation as a function of time, whereupon any anomalies observed in the recording curve make it possible to detect weld flaws.

Further properties and advantages of this invention will be brought out by the following description, reference being made to the accompanying drawings in which two embodiments of the invention are given by way of explanation but not in any sense by way of limitation, and in which.

Figure 1:
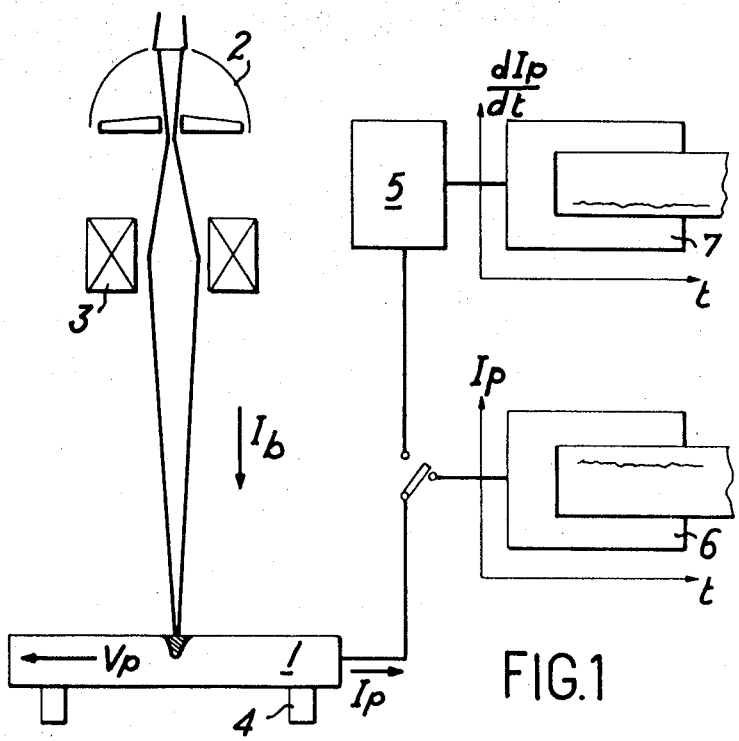
FIG. 1 shows two embodiments of the device for carrying out the method according to the invention in the case in which the graphically recorded current is the current $I_p$ which penetrates into the target.
Figure 2:
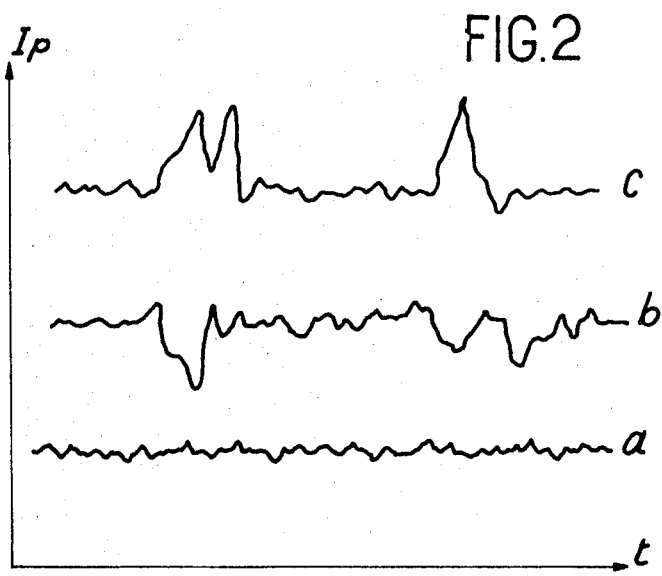
FIG. 2 represents on the same graph three recordings of the current $I_p$ as a function of time, respectively in the case of a flawless weld, of a weld having solid inclusions and of a weld containing blowholes, the treated part being formed of mild steel, and FIG. 3 corresponds to FIG. 1 in the case in which the graphically recorded current is the reflected electron current $I_R$.

In FIG. 1, the recorders which serve to carry out one form of execution of the method according to the invention are adapted to a device of known type for electron beam welding.

The target or part to be treated is shown at 1; the electron gun is a Pierce gun and is designated by the reference numeral 2; the electromagnetic focusing coil is designated by the reference numeral 3; and finally, an insulator is shown at 4.

The blowhole or crack which opens at the surface to be welded and is already present in the metal of the target corresponds to inclusions which have a zero atomic mass. In consequence, as the electron beam passes over said blowhole, there is a reduction in the backscattered current $I_r$ and an increase in the current $I_p$ which passes through the part 1. Moreover, the blowhole constitutes a microscopic Faraday cage which increases the number of electrons trapped in the target 1 and consequently increases the current $I_p$.

So far as the solid inclusions are concerned, they modify the continuous state of electron flow, probably by reason of a vapor tension which is different from that of the base metal; the same applies to a blowhole which is filled with gas and subsequently explodes in a vacuum.

It should be noted in addition that the depth of a weld can vary from the beginning to the end for the following reasons:

a. the part 1 is heated at the time of welding and the temperature of said part is higher at the end of the weld bead than at the beginning, thereby producing a variation in the thermoelectronic emission $I_t$ and therefore $I_p$;

b. one of the welding parameters varies; a variation $I_b$ results in a variation of $I_p$. Moreover, a variation in depth resulting from the variation $I_p$ produces a variation in width of the weld and a modification of the surface shape, thereby resulting in a variation in the thermoelectronic emission $I_t$ and consequently of $I_p$.

According to the method of the present invention, the curve of variation of the current $I_p$ which flows through the part 1 is plotted as a function of time from the beginning of the welding operation by means of a recorder 6 which is connected to the known electron beam welding device.

Any flaws which are present in welds result in abrupt variations in the recording curve.

FIG. 2 shows:

at $a$, the recording of the intensity $I_p$ in the case of a weld which is free from flaws;

at $b$, the recording obtained in the case of a weld containing metallic inclusions (for example graphite and tin) and, at $c$, the recording corresponding to a weld which exhibits surface blisters or blowholes, the treated part being formed of mild steel.

It is apparent that the presence of blowholes or inclusions is indicated by an abrupt variation in the current at the level of these flaws.

In another embodiment which gives more accurate indications, the recorder 6 is replaced by a recorder 7 which provides curves of variation of the derivative $dI_p/dt$ as a function of the time which has elapsed since the beginning of the welding operation and the circuit comprises a differentiator 5.

The method according to the invention is simple, continuous, immediate and nondestructive.

Should any anomaly be observed in the curves $I_p = f(t)$ or in the curves $dI_p/dt = f'(t)$, the flaw in the weld can be located when the welding speed and rate of transfer of the paper of the recorder (6 or 7) are known; it is then possible to determine the exact shape of the flaw by ultrasonic or gamma-radiographic inspection which, as has already been pointed out earlier, would not alone permit satisfactory detection of flaws which are present in the weld.

Figure 3:
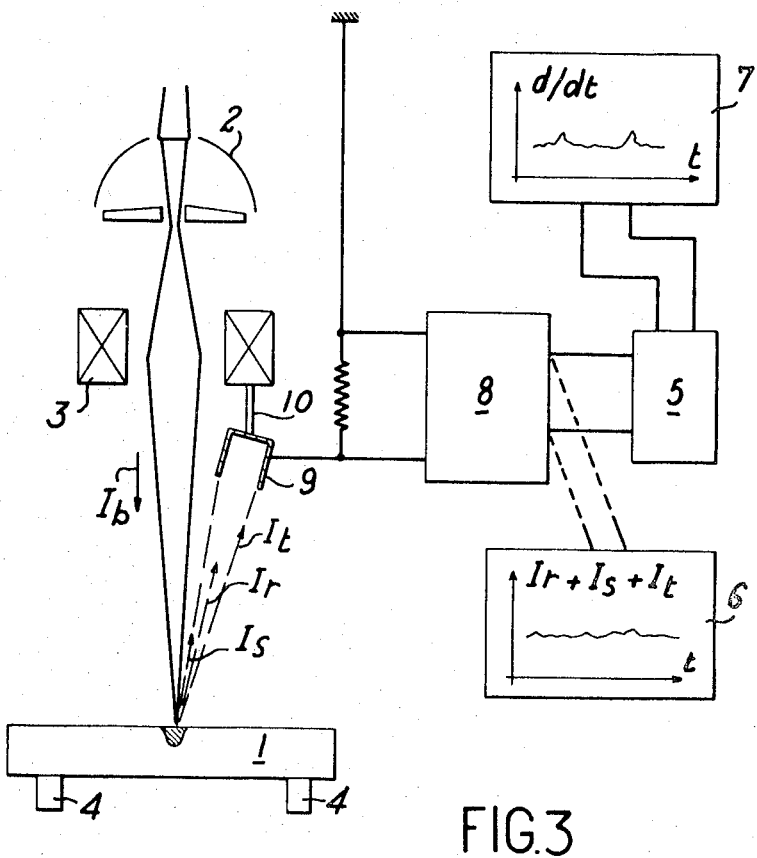

In an alternative embodiment shown in FIG. 3, the graphic recordings do not apply to the current $I_p$ which flows through the part to be welded (or target) but to the sum $I_R$ of the currents which pass out of the part on the weld face of this latter ($I_R = I_r + I_s + I_t$) or, more precisely, to a fraction of $I_R$.

There is placed above the target 1 a Faraday cage 9 or any means which makes it possible to measure a spatial fraction of the sum $I_R$ of the currents $I_r + I_s + I_t$. As in FIG. 3, this Faraday cage can be attached to the coil 3 provided that an insulator 10 is interposed between the cage and the coil.

The method according to this alternative embodiment consists in recording graphically either the current which is collected in the Faraday cage 9 at the time of the welding operation as a function of the time which has elapsed since the beginning of the welding operation by means of a recorder 6 or the derivative of said current by means of the recorder 7 with which the differentiator 5 is associated.

If the collected current is of low value, provision is made for an amplifier 8 upstream of the recorders.

As in the case of FIG. 1, anomalies which are observed in the recording curves obtained by means of the recorders 6 or 7 make it possible to detect flaws in the welding of the target 1 but it remains apparent that the peaks and valleys of these curves are reversed with respect to the peaks and valleys of the corresponding curves which would be obtained by means of the apparatus shown in FIG. 1.

The advantage of this alternative embodiment lies in particular in the fact that it is no longer necessary to isolate the target 1 at 4 since the total current $I_r+I_s+I_t$ appears even when the target is connected to ground, which is of interest in the case of heavy and cumbersome parts.

The faraday cage 9 is of small overall size and can be attached above the target 1 in different ways according to the shape of this latter. In particular, the cage can be given a shape of revolution with respect to the axis of the beam.

What we claim is:

1. A method of continuous inspection of the quality of a weld formed by electron bombardment of a part to be welded serving as the target of the electron beam, said electron beam providing an incident electron current $I_b$ which is subdivided at the target into a current $I_p$ which penetrates into the target at welding intensity and a reflected current $I_R$, comprising the steps of directing said electron beam at said target, detecting one of said two subdivided current $I_p$ and $I_R$, graphically recording said detected current as a function of the time which has elapsed from the beginning of the welding operation, and locating anomalies in the weld in accordance with the position of prominent deviations in the graphic recording of the detected current by comparing the position of the prominent deviations in the graphic recording to corresponding points on the weld.

2. A method as defined in claim 1 wherein said step of detecting one of said two subdivided currents comprises detecting the current $I_p$.

3. A method as defined in claim 1 wherein said step of detecting one of said two subdivided currents comprises detecting the current $I_R$.

4. A method as defined in claim 3, wherein prior to the step of graphically recording, said detected current is amplified.

5. A method as defined in claim 1, wherein said step of detecting one of said two subdivided currents includes the step of differentiating said detected current so as to provide a signal which indicates the rate of change of the detected current with time.

6. A method as defined in claim 1, wherein said step of locating anomalies in the weld includes the step of comparing the graphic recording of the detected current to a graphic recording of a flawless weld to detect the location of said prominent deviations.

* * * * *